United States Patent [19]
Takahashi et al.

[11] Patent Number: 5,125,685
[45] Date of Patent: Jun. 30, 1992

[54] CABLE REEL FOR EXPANDABLE AND CONTRACTIBLE STEERING DEVICE OF VEHICLE

[75] Inventors: Masaki Takahashi, Furukawa; Hironori Kato, Sendai; Masashi Takezawa, Utsunomiya, all of Japan

[73] Assignee: Alps Electric Co., Ltd., Tokyo, Japan

[21] Appl. No.: 779,116

[22] Filed: Oct. 15, 1991

Related U.S. Application Data

[63] Continuation of Ser. No. 577,946, Sep. 5, 1990, abandoned.

[30] Foreign Application Priority Data

Sep. 11, 1989 [JP] Japan .......................... 1-105377[U]

[51] Int. Cl.⁵ .............................................. B62D 1/18
[52] U.S. Cl. ...................................... 280/775; 74/493
[58] Field of Search ............... 280/775, 777, 779, 780; 74/492, 493

[56] References Cited

U.S. PATENT DOCUMENTS

| | | | |
|---|---|---|---|
| 3,468,182 | 9/1969 | Shwartzberg | 280/777 |
| 3,815,438 | 6/1974 | Johnson | 280/777 |
| 4,630,716 | 12/1986 | Faust | 280/777 |

FOREIGN PATENT DOCUMENTS

| | | | |
|---|---|---|---|
| 2559146 | 7/1976 | Fed. Rep. of Germany | 74/492 |
| 2491854 | 4/1982 | France | 74/492 |

Primary Examiner—Charles A. Marmor
Assistant Examiner—Tamara L. Graysay
Attorney, Agent, or Firm—Guy W. Shoup; B. Noel Kivlin

[57] ABSTRACT

The present invention relates to a cable reel in which an electrical connection between a fixed body and a movable body is made through a flat cable. The cable reel is suitable for installing on an expandable and contractible steering device of a vehicle, the device having a telescopic function. The cable reel includes the fixed body, the movable body rotatably attached to the fixed body, and the flat cable which is housed between the fixed body and the movable body while being wound around, and a storage housing having a pair of retaining bodies which are relatively and slidably connected to each other. Both the ends of the flat cable are electrically connected to the outsides of the fixed body and the movable body, respectively. The flat cable led out of the fixed body is affixed to the retaining bodies, respectively, and is curved in a semi-loop-like shape between fixed sections.

3 Claims, 5 Drawing Sheets

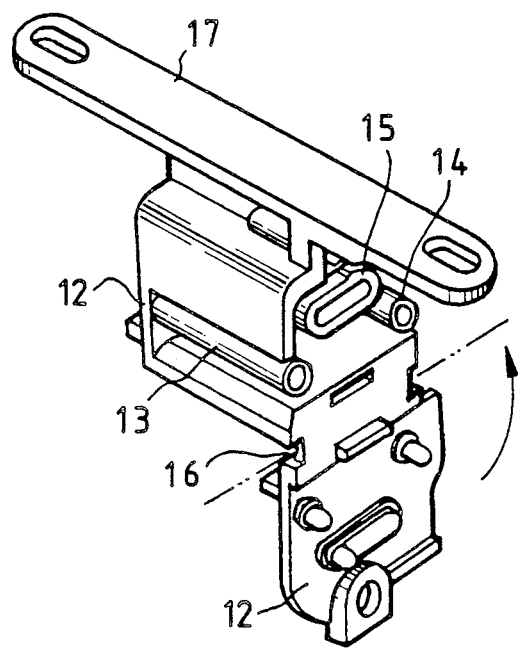
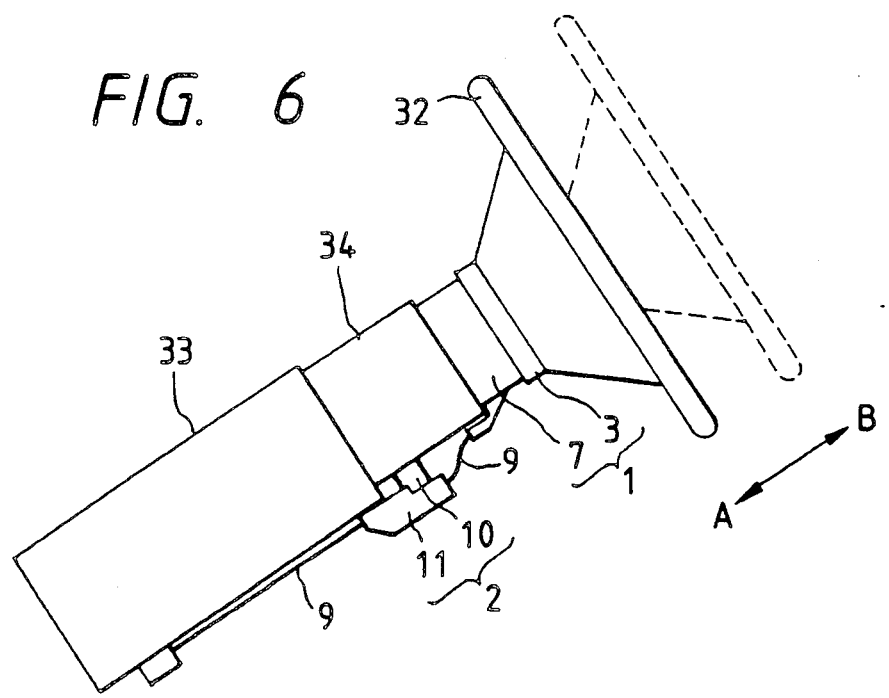

CABLE REEL FOR EXPANDABLE AND CONTRACTIBLE STEERING DEVICE OF VEHICLE

This application is a continuation of application Ser. No. 07/577,946 filed Sept. 5, 1990, abandoned.

BACKGROUND OF THE INVENTION

1. Field of the Invention

The present invention relates to a cable reel in which an electrical connection between a fixed body and a movable body is made through a flat cable. More particularly, it relates to a cable reel suitable for installing on an expandable and contractible steering device of a vehicle, the device having a telescopic function.

2. Description of the Related Art

In cable reels, one end of a plurality of turns of a flat cable is secured to and led out of fixed bodies, whereas the other end of the cable is secured to and led out of movable bodies. When the movable body rotates, it rotates through a predetermined angle by virtue of the fact that the flat cable is caused to wind toward the side of the movable body, or to re-wind from it. Cable reels are installed on steering devices of automobiles in order to serve as air bag circuits, horn circuits or cruise control circuits (Japanese Patent Unexamined Publication No. 57-66043).

When such a cable reel is incorporated into a steering device, the movable body is secured to the side of a steering wheel, while the fixed body is secured to members of the fixed side of a column cover or the like. The flat cable led out of the fixed body is connected to a connector on the fixed side. In a steering device equipped with a so-called telescopic function, in which a steering wheel can be adjusted in the axial direction of the steering shaft, since the distance between the cable reel body and the connector changes during the movement of the steering wheel, a leading section which is led from the fixed body of the flat cable must be designed long enough to allow for the amount of the distance change.

When the leading section of the flat cable becomes long, because it becomes an obstacle if left slack, a storage device, for example, as disclosed in Japanese Patent Examined Publication No. 63-32527 is required. In such a storage device, a harness spool is provided between the movable side and the fixed side of a steering device with the telescopic function. At the same time, a plurality of wire harnesses led out of the steering wheel are housed in the harness spool while being helically wound. The movement of the steering wheel in the axial direction is thus absorbed by changing the radii of the wire harnesses wound in the harness spool.

According to the above-mentioned conventional storage device, during the telescopic operation, e.g., when the steering wheel is pulled toward the driver, the radii of the wound wire harnesses change in the direction in which they become small. On the other hand, when the steering wheel is pushed, the radii of the wound wire harnesses change in the direction in which they become large. Since the radii of the wound wire harnesses can be changed within the harness spool, long wire harnesses can be housed in a relatively small space.

However, because the flat cable used as a lead wire of the cable reel has a high bending rigidity and a larger width dimension, as compared with the wire harness, when the foregoing storage device is applied to the cable reel, a problem occurs in that a space for housing the leading section of the flat cable becomes excessively large. There is also a problem in that the reliability of the connection of the flat cable is lowered, because of an excessive twisting force acting on the flat cable.

SUMMARY OF THE INVENTION

In view of the aforesaid conventional art, it is an object of the present invention to provide a highly reliable cable reel for an expandable and contractible steering device of a vehicle, the cable minimizing the installation space.

To accomplish the foregoing object, the present invention provides a cable reel for an expandable and contractible steering device of a vehicle, wherein the cable reel comprises a fixed body, a movable body rotatably attached to the fixed body, and a flat cable which is housed between the fixed body and the movable body while being wound around, both the ends of the flat cable being electrically connected to the outsides of the fixed body and the movable body, respectively, and wherein the cable reel comprises a storage housing having a pair of retaining bodies which are relatively and slidably connected to each other, and wherein the flat cable led out of the fixed body is affixed to the retaining bodies, respectively, being curved in a semi-loop-like shape between these fixed sections.

When the distance between the fixed body of the cable reel and one of the retaining bodies of the storage housing expands or contracts, with the shifting of the steering wheel in the axial direction, the change in distance is absorbed by virtue of the fact that both the retaining bodies of the storage housing move relative to each other. As the retaining bodies move, the shape of the flat cable is changed while the cable is being curved within the storage housing.

Other features will become apparent from the following Description of the Preferred Embodiment when read with reference to the accompanying drawings.

BRIEF DESCRIPTION OF THE DRAWINGS

All of the drawings pertain to the embodiment of the present invention.

FIG. 5 is a perspective view illustrating a movable holder before it is assembled;

FIG. 6 is a schematic illustration of the cable reel when it is actually installed.

DESCRIPTION OF THE PREFERRED EMBODIMENT

An embodiment of the present invention will be described hereinafter with reference to the accompanying drawings.

Figure 1:
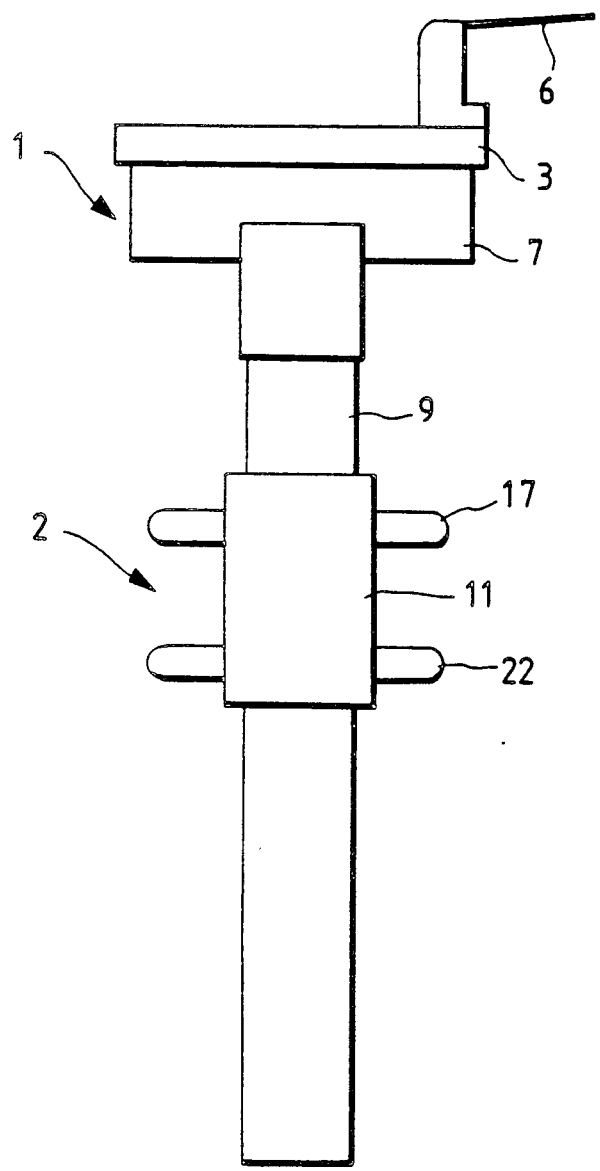
FIG. 1 is a front elevation view of a cable reel.

FIG. 1 is a front elevation view of a cable reel according to an embodiment of the invention. As illustrated in FIG. 1, the cable reel includes a cable reel body 1 and a storage housing 2.

Figure 2:
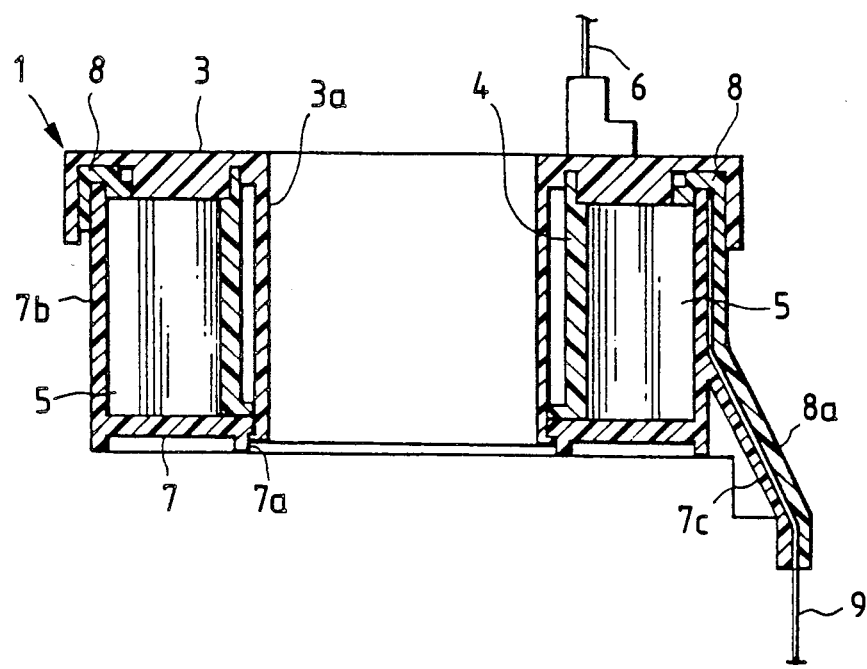
FIG. 2 is a cross-sectional view of the cable reel.

FIG. 2 is a cross-sectional view schematically showing the structure of the cable reel body 1. In FIG. 2, numeral 3 denotes a movable body in which a rotary cylinder 3a is vertically arranged at the center thereof, and a cylindrical holder 4 is disposed outside the rotary cylinder 3a. The holder 4 has an axially extending slit (not shown), and is affixed to a top plate section of the movable body 3 so as to leave a predetermined space between the holder 4 and the periphery of the rotary cylinder 3a. Numeral 5 denotes a flat cable where a plurality of conductors are laminated by a pair of flexible films made of polyethylene terephthalate or the like. The flat cable 5 is wound around a plurality of times. The leading portion of the wound flat cable 5 is rewound inside the holder 4 after having passed through the slit, and is led out of the movable body 3. An unillustrated connector is connected to the end of a leading section 6 on the movable side of the movable body 3.

Numeral 7 designates a fixed body. A center hole 7a in which the rotary cylinder 3a of the above movable body 3 snaps is formed at the center of the fixed body 7. An outer ring wall 7b, regulating the re-winding position of the above mentioned flat cable 5, is vertically arranged on the periphery edge of the fixed body 7. Further, a ring member 8 is attached to the top end of the outer ring wall 7b, and the movable body 3 is caused to slidably rotate along the ring member 8. Furthermore, guide sections 7c, 8a are formed, so as to protrude diagonally downward, in parts of the fixed body 7 and the ring member 8. The end of the wound portion of the flat cable 5 is re-wound inside the outer ring wall 7b, and then is led out of the fixed body 7, after having passed through the guide sections 7c, 8a. A leading section 9 on the fixed side of the guide sections 7c, 8a leads to the above storage housing 2.

The storage housing 2 will now be described in detail with reference to FIGS. 3 through 5.

Figure 3:
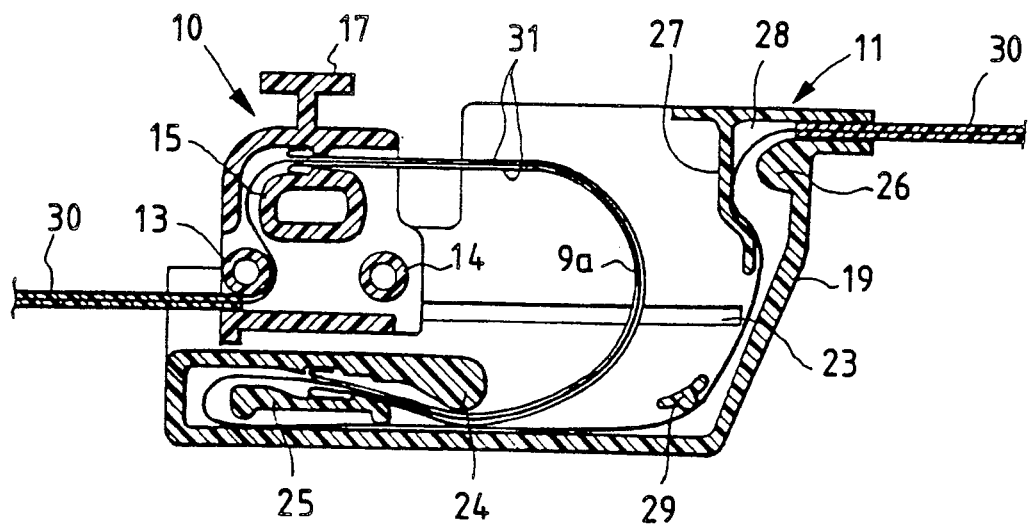
FIG. 3 is a cross-sectional view of a storage housing.
Figure 4:
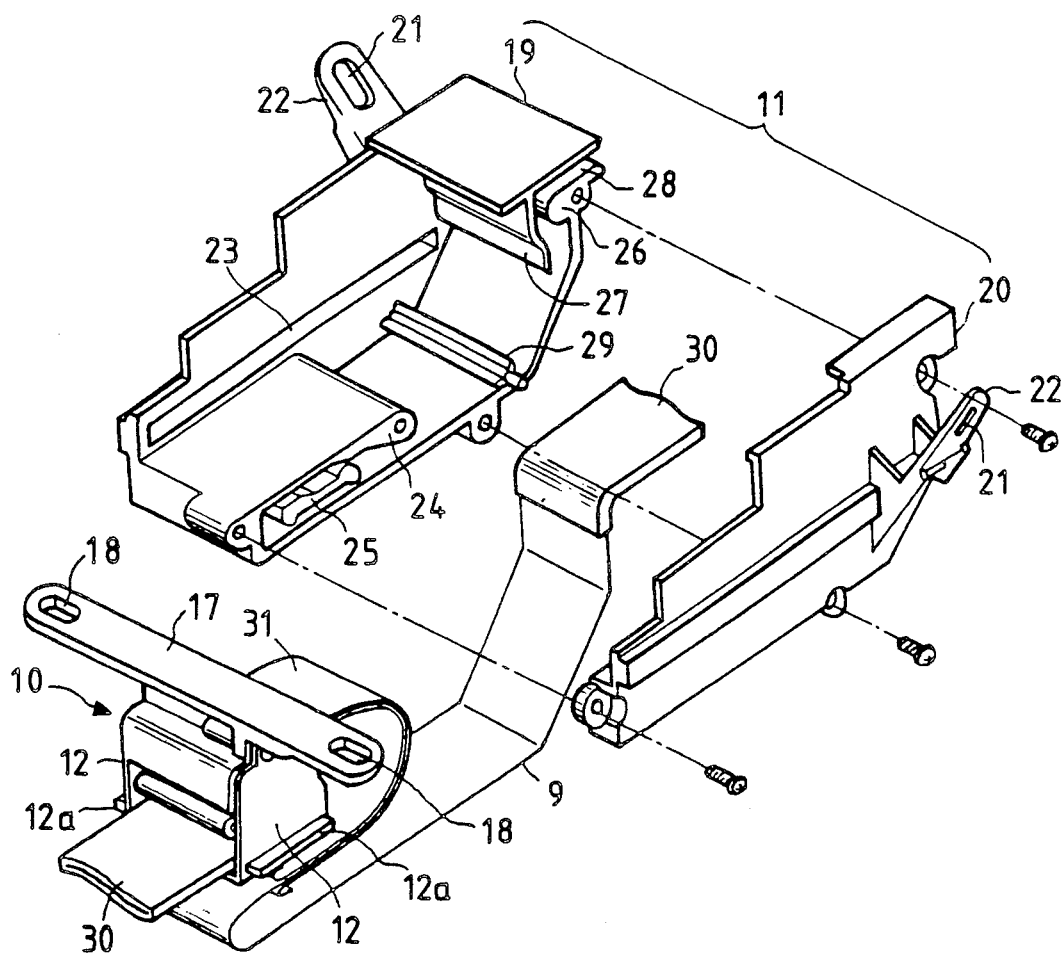
FIG. 4 is an exploded perspective view of the storage housing.

FIG. 3 is a cross-sectional view of the storage housing 2; FIG. 4 is an exploded perspective view of the storage housing 2; and FIG. 5 is a perspective view illustrating a movable holder with which the storage housing 2 is equipped. In these drawings, numeral 10 indicates a movable holder, while 11 indicates a fixed holder. Both of the holders 10, 11 are slidably connected to each other and constitute the storage housing 2.

The movable holder 10 has a pair of side plates 12. Two cylindrical struts 13, 14 and one track-shaped guide post 15 are installed between the two side plates 12. Further, projections 12a are formed on the outer surfaces of the side plates 12. As illustrated in FIG. 5, a block body including the pair of side plates 12 consists of an integrally molded item which is connected to the pair of side plates 12 through a thin-walled hinge 16. As shown in FIG. 4, the movable holder 10 in which one side plate 12 faces the other side plate 12 is formed by bending, along the hinge 16, one side plate 12 toward the other side plate 12 by an angle of 180°, before the movable holder 10 is screwed. In other words, the movable holder 10 is formed by bending, along a dash-and-two-dot line or bending line, one side plate 12 toward the other side plate 12 in a direction indicated by an arrow. The movable holder 10 further has a strip-like leg 17, and track-shaped attaching holes 18 are formed in both ends of the strip-like leg 17.

The above-mentioned fixed holder 11 is made up of a substrate 19 and a cover 20, both of which are integrally joined to each other by means of a plurality of screws. A leg 22 having a track-shaped attaching hole 21 is provided on the outer face of the substrate 19 and on the outer face of the cover 20. Furthermore, longitudinally extending guide grooves 23 are formed on the inner face of the substrate 19 and on the inner face of the cover 20 (the guide groove on the side of the cover 20 is not shown). The above projections 12a of the movable body 10 are engaged with the guide grooves 23 so as to travel back and forth along the guide grooves 23.

A partition 24 forming a cave-like space and a guide wall 25 located in the cave-like space are provided on one side along the longitudinal direction of the above-mentioned substrate 19. Further, a semi-cylindrical expanding wall 26 and a regulating wall 27 opposite to the expanding wall 26 are provided on the other side of the substrate 19. A cable discharging path 28 is partitioned between the expanding wall 26 and the regulating wall 27. Also, a guide rod 29 is provided inside the substrate 19. The foregoing partition 24, guide wall 25, expanding wall 26, regulating wall 27, and the guide rod 29 extend so as to form a bridge from the side plate of the substrate 19 to the cover 20.

The foregoing leading section 9 on the fixed side of the guide sections 7c, 8a which is led out of the fixed body 7 of the cable reel body 1 is caused to lead to the inside of the partition 24 while being curved in a semi-loop shape, after the leading section 9 is affixed to the movable holder 10 while being curved in an S shape along the peripheral faces of the strut 13 and of the guide post 15 of the movable holder 10. Thus, the strut 13 and the guide post 15 collectively form a means for bending the flat cable 9 housed within the storage housing 2 in an S-shape. The leading section 9 is further made to be affixed to the fixed holder 11, after having been turned the other way along the guide wall 25, and then to lead out of the fixed holder 11, after having passed, while being guided by the guide rod 29, through the cable discharging path 28 between the expanding wall 26 and the regulating wall 27. Further, protective tapes 30 made of vinyl chloride resin or the like are stuck to the leading section of the fixed holder 11 and part of the flat cable 9 between the cable reel body 1 and the movable holder 10. Furthermore, a curved section 9a of the flat cable 9, leading from the fixed holder 10 to the fixed section of the fixed holder 11, is clamped together by a pair of supporting plates 31 made of a flexible film. Both ends of these supporting plates 31 are attached to the stages of the guide post 15, the partition 24, the guide wall 25, and the like to prevent the flat cable 9 from coming off.

FIG. 6 is a schematic illustration of the cable reel constructed as described above when the cable reel is actually installed on an expandable and contractible steering device with a telescopic function. In FIG. 6, numeral 32 denotes a steering wheel; 33 denotes a column; and 34 denotes a telescopic function. The movable body 3 of the cable reel body 1 is secured to the side of the steering wheel 32, and the fixed body 7 is secured to the side of the movable stage of the telescopic function 34. The leg 17 of the movable holder 10 in the storage housing 2 is secured to the movable stage side of the telescopic function 34, and the leg 22 of the fixed holder 11 is secured to the members on the fixed side of the column 33 and the like. The steering wheel 32, the cable reel body 1 and the movable holder 10 of the storage housing 2 are made to shift by the telescopic function 34 in axial directions of an unillustrated steering shaft (in directions indicated by arrows A and B).

Under such conditions where the cable reel body 1 is actually installed, rotating the steering wheel 32 in one direction causes the flat cable 5 in the cable reel body 1 to be wound toward the holder 4 of the movable body 3, while on the contrary, rotating the steering wheel 32 in the other direction causes the flat cable 5 to be rewound to the side of the outer ring wall 7b of the fixed body 7. In either case, an electrical connection between the steering wheel 32 and the cable reel body 1 is maintained by the leading section 6 on the movable side of the flat cable 5; an electrical connection between the movable body 3 and the fixed body 7 of the cable reel body 1 is maintained by the flat cable 5; and an electrical connection between the cable reel body 1 and the members on the fixed side of the column 33 and the like is maintained through the leading section 9 on the fixed side of the flat cable 5.

Figure 7:
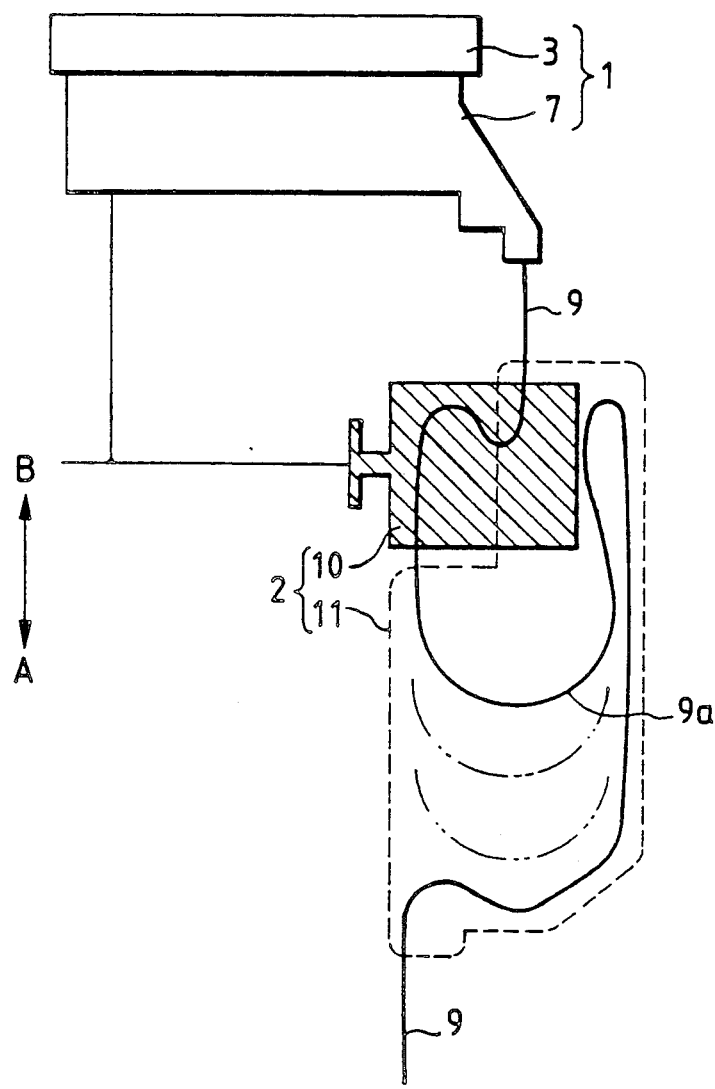
FIG. 7 is a view showing the operation of the storage housing.

FIG. 7 is a view showing the operation of the storage housing 2 and corresponds to the state where the steering wheel 32 is pulled in the direction indicated by the arrow B (a position indicated by broken lines) of FIG. 6. In this case, the movable holder 10 and the fixed holder 11 are in the state where they are expanded to the fullest extent. The curved section 9a of the flat cable 9 is positioned where it is indicated by a solid line.

On the contrary, when the steering wheel 32 is pushed in the direction indicated by the arrow A of FIG. 6, the cable reel body 1 and the movable holder 10 shift in the same direction as that of the steering wheel 32, as the steering wheel 32 moves. The movable holder 10 descends inside the fixed holder 11 by virtue of the fact that the projections 12a slide in the guide grooves 23. Due to the above, the distance between the movable body 10 and the fixed holder 11 is made the shortest, and this change in distance is absorbed by the shifting of the curved section 9a of the flat cable 9 as indicated by dash-and-two-dot lines of FIG. 7.

Thus, in the above-described embodiment, since the axial shift of the steering wheel 32 during the telescopic operation is absorbed by the shifting, within the storage housing 2, of the curved section 9a of the flat cable 9, it is possible to arrange the leading section 9 of the flat cable 5 in a small space, the leading section 9 being required between the cable reel body 1 and an external connector.

Further, the supporting plates 31 overlapped at the curved section 9a of the flat cable 9 prevent the curved section 9a from being bent, thereby improving the reliability of the cable reel.

Furthermore, because the movable holder 10 is an integrally molded item which is connected to the pair of side plates 12 through the hinge 16, it is possible to reduce the number of required parts.

In addition, it is possible to absorb to some extent errors in dimensions of the various parts, since the flat cable 9 is capable of shifting between the struts 13, 14 within the movable holder 10, and since the attaching holes 18 of the movable holder 10 and the attaching holes 21 of the fixed holder 11 are shaped like long, slender tracks in directions perpendicular to the shifting direction of the flat cable 9.

As has been described above, according to the present invention, even when the distance between the cable reel body and the external connector changes during the telescopic operation or the like, it is possible to house the above leading section of the flat cable in a small space without slacking it, the leading section being required between the cable reel body and the external connector. This is because the flat cable led out of the fixed body is affixed to a pair of retaining bodies consisting of movable holder 10 and fixed holder 11 which are relatively and slidably connected to each other, and because a semi-loop-like curved section is formed between the pair of retaining bodies. The value of the practical use of the cable reel is thus enhanced.

As many widely different embodiments of the present invention can be made without departing from the spirit and scope thereof, it is to be understood that the invention is not limited to the specific embodiment thereof except as defined in the appended claims.

What is claimed is:

1. A cable reel for an expandable and contractible steering device of a vehicle, wherein said cable reel comprises a fixed body, a movable body rotatably attached to said fixed body, and a flat cable which is housed between said fixed body and said movable body while being wound around, both the ends of said flat cable being electrically connected at the outsides of said fixed body and said movable body, and wherein said cable reel comprises a storage housing having a pair of retaining bodies which are relatively and slidably connected to each other, and wherein a portion of said flat cable that is led out of said fixed body is affixed to and housed within said retaining bodies, and wherein the portion of said flat cable housed within said retaining bodies has a curved shape.

2. The cable reel for an expandable and contractible steering device of a vehicle according to claim 1, wherein said portion of said flat cable having said curved shape moves in substantially the same direction as a sliding direction of one of said pair of retaining bodies.

3. The cable reel for an expandable and contractible steering device of a vehicle according to claim 1, further comprising means for bending said flat cable housed within said retaining bodies in an S-shape to cause said flat cable to bend in an S-shape within said storage housing.

* * * * *

UNITED STATES PATENT AND TRADEMARK OFFICE
CERTIFICATE OF CORRECTION

PATENT NO.   :   5,125,685
DATED        :   June 30, 1992
INVENTOR(S)  :   Takahashi et al.

It is certified that error appears in the above-identified patent and that said Letters Patent is hereby corrected as shown below:

On the title page, Item [73]:
   Assignee:

Alps Electric Co., Ltd., Tokyo, Japan and Honda Giken Kogyo Kabushiki Kaisha, Tokyo, Japan Signed and Sealed this Twenty-second Day of March, 1994

*Attest:*

BRUCE LEHMAN

*Attesting Officer*      *Commissioner of Patents and Trademarks*